United States Patent
Fukawatase et al.

(10) Patent No.: US 9,796,352 B2
(45) Date of Patent: Oct. 24, 2017

(54) VEHICLE AIRBAG SYSTEM

(71) Applicant: TOYOTA JIDOSHA KABUSHIKI KAISHA, Toyota-shi, Aichi-ken (JP)

(72) Inventors: Osamu Fukawatase, Miyoshi (JP); Atsushi Nakashima, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/077,732

(22) Filed: Mar. 22, 2016

(65) Prior Publication Data

US 2016/0297393 A1 Oct. 13, 2016

(30) Foreign Application Priority Data

Apr. 9, 2015 (JP) ................................. 2015-080215

(51) Int. Cl.
*B60R 21/231* (2011.01)
*B60R 21/00* (2006.01)

(52) U.S. Cl.
CPC .... *B60R 21/231* (2013.01); *B60R 2021/0009* (2013.01); *B60R 2021/23107* (2013.01); *B60R 2021/23161* (2013.01)

(58) Field of Classification Search
CPC ............ B60R 21/231; B60R 21/23138; B60R 2021/0009; B60R 2021/23107; B60R 2021/23161
See application file for complete search history.

(56) References Cited

U.S. PATENT DOCUMENTS

| | | | |
|---|---|---|---|
| 5,031,929 A * | 7/1991 | Henseler | B60R 21/231 280/730.1 |
| 8,882,138 B1 * | 11/2014 | Hicken | B60R 21/231 280/730.1 |
| 9,227,587 B1 * | 1/2016 | Belwafa | B60R 21/205 |
| 9,272,684 B1 * | 3/2016 | Keyser | B60R 21/237 |
| 2015/0166002 A1 * | 6/2015 | Fukawatase | B60R 21/233 280/730.1 |
| 2015/0367802 A1 * | 12/2015 | Fukawatase | B60R 21/205 280/732 |
| 2016/0009242 A1 | 1/2016 | Fukawatase | |
| 2016/0039385 A1 * | 2/2016 | Watamori | B60R 21/23138 280/730.1 |
| 2016/0046257 A1 * | 2/2016 | Yamada | B60R 21/2338 280/729 |

FOREIGN PATENT DOCUMENTS

| | | |
|---|---|---|
| JP | H03-000547 A | 1/1991 |
| JP | H06-24282 A | 2/1994 |
| JP | H06-72276 A | 3/1994 |

(Continued)

*Primary Examiner* — Drew J Brown
(74) *Attorney, Agent, or Firm* — Oliff PLC

(57) ABSTRACT

A vehicle airbag system including: a first airbag that is supplied with gas and inflated and deployed at a front face towards a vehicle front of a seat; and a second airbag that is supplied with gas and inflated and deployed adjacent, in a vehicle width direction, to the first airbag, and that includes an overhanging deployment section that is positioned at a vehicle rear side of the first airbag and that is inflated and deployed jutting out beside the first airbag so as to cover a vehicle width direction end portion of the first airbag from the vehicle rear.

10 Claims, 6 Drawing Sheets

(56) References Cited

FOREIGN PATENT DOCUMENTS

| | | | |
|---|---|---|---|
| JP | H08-324373 | A | 12/1996 |
| JP | 2012-056371 | A | 3/2012 |
| JP | 2015-120382 | A | 7/2015 |
| JP | 2016-020115 | A | 2/2016 |
| JP | 2016-049882 | A | 4/2016 |

* cited by examiner

VEHICLE AIRBAG SYSTEM

CROSS-REFERENCE TO RELATED APPLICATION

This application is based on and claims priority under 35 USC 119 from Japanese Patent Application No. 2015-080215 filed on Apr. 9, 2015, the disclosure of which is incorporated by reference herein.

BACKGROUND

Technical Field

The present invention relates to a vehicle airbag system.

Related Art

Devices configured with a pair of extension sections, extending toward the vehicle rear side at a height corresponding to the head or shoulders of an occupant, from locations of a pair of inflation sections are known as front passenger seat airbag devices (see, for example, Japanese Patent Application Laid-Open (JP-A) No. 2012-56371). An airbag device for a front seat for a three occupants is also known (see, for example, JPA Nos. H06-72276 and H06-24282).

The configuration in JPA-No. 2012-56371 enables a front passenger seat occupant moving obliquely forward toward the collision side in an oblique collision at a driver seat side to be restrained.

However, there is a concern that, when the head of the occupant moving obliquely forward in an oblique collision of the vehicle contacts an airbag, the head rotates about an axis along the up-down direction.

SUMMARY

An object of the present invention is to obtain a vehicle airbag system capable of suppressing rotation of the head of an occupant accompanying restraint of the head in an oblique collision or a small overlap collision.

A vehicle airbag system of a first aspect of the present invention includes a first airbag that is supplied with gas and inflated and deployed at a front face towards a vehicle front of a seat, and a second airbag that is supplied with gas and inflated and deployed adjacent, in a vehicle width direction, to the first airbag, and that includes an overhanging deployment section that is positioned at a vehicle rear side of the first airbag and that is inflated and deployed jutting out beside the first airbag so as to cover a vehicle width direction end portion of the first airbag from the vehicle rear.

In this vehicle airbag system, the first airbag and the second airbag are supplied with gas and inflated and deployed in an oblique collision or a small overlap collision, for example. The first airbag is inflated and deployed at the front face of the seat (occupant), and the main deployment section of the second airbag is inflated and deployed adjacent in the vehicle width direction to the first airbag. The overhanging deployment section of the second airbag covers the vehicle width direction end portion of the first airbag from the vehicle rear. Thus, in an oblique collision or a small overlap collision at the deployment side of the second airbag, the occupant moving obliquely forward toward the collision side is restrained by the first airbag and the second airbag.

Note that the head of the occupant who is moving obliquely forward as described above contacts, and is restrained by, both the vehicle width direction end portion of the first airbag and the overhanging deployment section of the second airbag. Rotation of the head of the occupant accompanying restraint of the head is thereby suppressed, compared to a configuration in which the head of the occupant only contacts an end portion at the vehicle width direction center side of the first airbag. When this occurs, the overhanging deployment portion of the second airbag contacts the head, such that the duration in which the head only contacts the vehicle width direction end portion of the first airbag is shorter than in a configuration including a second airbag that does not include an overhanging deployment portion, or this duration is eliminated. Rotation of the head of the occupant accompanying restraint of the head is thereby effectively suppressed.

Thus, the configuration of the first aspect of the present invention enables rotation of the head of the occupant accompanying restraint of the head in an oblique collision or a small overlap collision to be suppressed.

A vehicle airbag system of a second aspect of the present invention has the configuration of the first aspect, wherein the first airbag is a driver seat airbag that is inflated and deployed in front of a driver seat, and the second airbag includes a main deployment section, which is inflated and deployed between the driver seat and a front passenger seat, and the overhanging deployment section that is inflated and deployed jutting out toward the vehicle width direction outside from a vehicle rear end of the main deployment section so as to cover an end portion at the vehicle width direction center side of the driver seat airbag from the vehicle rear.

In this vehicle airbag system, the driver seat airbag and the second airbag are supplied with gas and inflated and deployed in an oblique collision or a small overlap collision, for example. The driver seat airbag is inflated and deployed at the front face of the driver seat (occupant), and the main deployment section of the second airbag is inflated and deployed between the driver seat and the front passenger seat, namely, at the vehicle width direction center side (front passenger seat side) of the driver seat airbag. Thus, in an oblique collision or a small overlap collision at the front passenger seat side, the occupant of the driver seat moving obliquely forward toward the collision side is restrained by the driver seat airbag and the second airbag.

Note that the head of the occupant who is moving obliquely forward as described above contacts, and is restrained by, both the end portion at the vehicle width direction center side of the driver seat airbag and the overhanging deployment section of the second airbag. Rotation of the head of the occupant accompanying restraint of the head is thereby suppressed, compared to a configuration in which the head of the occupant only contacts the end portion at the vehicle width direction center side of the driver seat airbag.

A vehicle airbag system of a third aspect of the present invention has the configuration of the first aspect, wherein the first airbag is a front passenger seat airbag that is inflated and deployed in front of a front passenger seat, and the second airbag includes a main deployment section that is inflated and deployed between a driver seat and the front passenger seat, and the overhanging deployment section, which is inflated and deployed jutting out toward the vehicle width direction outside from a vehicle rear end of the main deployment section so as to cover an end portion at the vehicle width direction center side of the front passenger seat airbag from the vehicle rear.

In this vehicle airbag system, the front passenger seat airbag and the second airbag are supplied with gas and inflated and deployed in an oblique collision or a small overlap collision, for example. The front passenger seat airbag is inflated and deployed at the front face of the front passenger seat (occupant), and the main deployment section of the second airbag is inflated and deployed between the driver seat and the front passenger seat, namely, at the vehicle width direction center side (driver seat side) of the front passenger seat airbag. Thus, in an oblique collision or a small overlap collision at the driver seat side, the occupant of the front passenger seat moving obliquely forward toward the collision side is restrained by the front passenger seat airbag and the second airbag.

Note that the head of the occupant who is moving obliquely forward as described above contacts, and is restrained by, both the end portion at the vehicle width direction center side of the front passenger seat airbag and the overhanging deployment section of the second airbag. Rotation of the head of the occupant accompanying restraint of the head is thereby suppressed, compared to a configuration in which the head of the occupant only contacts the end portion at the vehicle width direction center side of the front passenger seat airbag.

A vehicle airbag system of a fourth aspect of the present invention has the configuration of the first aspect, wherein a driver seat airbag that is inflated and deployed in front of a driver seat and a front passenger seat airbag that is inflated and deployed in front of a front passenger seat are included in the first airbag, and the second airbag includes a main deployment section that is inflated and deployed between the driver seat and the front passenger seat, and a pair of overhanging deployment sections, which are respectively inflated and deployed jutting out from a vehicle rear end of the main deployment section toward both vehicle width direction sides so as to cover respective end portions at the vehicle width direction center sides of the driver seat airbag and the front passenger seat airbag from the vehicle rear.

In this vehicle airbag system, the driver seat airbag, the front passenger seat airbag, and the second airbag are supplied with gas and inflated and deployed in an oblique collision or a small overlap collision, for example. The driver seat airbag is inflated and deployed at the front face of the driver seat (occupant), the front passenger seat airbag is inflated and deployed at the front face of the front passenger seat (occupant), and the main deployment section of the second airbag is inflated and deployed between the driver seat and the front passenger seat.

Thus, in an oblique collision or a small overlap collision at the front passenger seat side, for example, the occupant of the driver seat moving obliquely forward toward the collision side is restrained by the driver seat airbag and the second airbag. In such cases, the head of the occupant who is moving obliquely forward contacts, and is restrained by, both the end portion at the vehicle width direction center side of the driver seat airbag and the overhanging deployment section of the second airbag. Rotation of the head of the occupant accompanying restraint of the head is thereby suppressed, compared to a configuration in which the head of the occupant only contacts the end portion at the vehicle width direction center side of the driver seat airbag.

Moreover, in an oblique collision or a small overlap collision at the driver seat side, for example, the occupant of the front passenger seat moving obliquely forward toward the collision side is restrained by the front passenger seat airbag and the second airbag. In such cases, the head of the occupant who is moving obliquely forward contacts, and is restrained by, both the end portion at the vehicle width direction center side of the front passenger seat airbag and the overhanging deployment section of the second airbag. Rotation of the head of the occupant accompanying restraint of the head is thereby suppressed, compared to a configuration in which the head of the occupant only contacts the end portion at the vehicle width direction center side of the front passenger seat airbag.

A vehicle airbag system of a fifth aspect of the present invention has the configuration of the second aspect or the fourth aspect, wherein the second airbag further includes a front side overhanging deployment section that is inflated and deployed jutting out from the main deployment section toward the vehicle width direction outside so as to cover an end portion at the vehicle width direction center side of the driver seat airbag from the vehicle front.

In this vehicle airbag system, when the second airbag is inflated and deployed, the front side overhanging deployment section is inflated and deployed so as to cover the end portion at the vehicle width direction center side of the driver seat airbag from the vehicle front. The driver seat airbag that restrains the occupant is suppressed from tilting, and occupant protection performance in an oblique collision or a small overlap collision at the front passenger seat side is improved, by the front side overhanging deployment section.

A vehicle airbag system of a sixth aspect of the present invention has the configuration of any one of the first aspect to the fifth aspect, wherein in an inflated and deployed state, the overhanging deployment section faces across a gap toward a vehicle rearward facing portion of the first airbag.

In this vehicle airbag system, in the inflated and deployed state of the first airbag and the second airbag, a gap is formed between the rearward facing portion of the vehicle width direction end portion of the first airbag and a vehicle front end side portion of the overhanging deployment section. When the head of the occupant, who is moving obliquely forward, enters this gap, the contact surface area between the overhanging deployment section and the head of the occupant is larger than in cases in which there is no gap. Rotation of the head of the occupant accompanying restraint of the head is even more effectively suppressed.

The vehicle airbag system according to the present invention as explained above has an excellent advantageous effect of enabling rotation of the head of an occupant accompanying restraint of the head in an oblique collision or a small overlap collision to be suppressed.

BRIEF DESCRIPTION OF THE DRAWINGS

Exemplary embodiments of the present invention will be described in detail based on the following figures, wherein.

DETAILED DESCRIPTION

Explanation follows regarding a vehicle airbag system 10 according to an exemplary embodiment of the present invention, based on FIG. 1 to FIG. 5B. Note that in each of the drawings as appropriate, the arrow FR, the arrow UP, the arrow LH, and the arrow RH respectively indicate the front direction, upper direction, and the left side, this being one vehicle width direction side, and the right side, this being another vehicle width direction side, of an automobile V applied with the vehicle airbag system 10 (see FIGS. 2A, 2B). In the below explanation, unless specifically stated otherwise, simple reference to the front-rear, up-down, and left-right directions refers to front and rear in the vehicle front-rear direction, up and down in the vehicle up-down direction, and the left and right of the vehicle (when facing the front).

Schematic Configuration of Automobile V Interior

Figure 1:
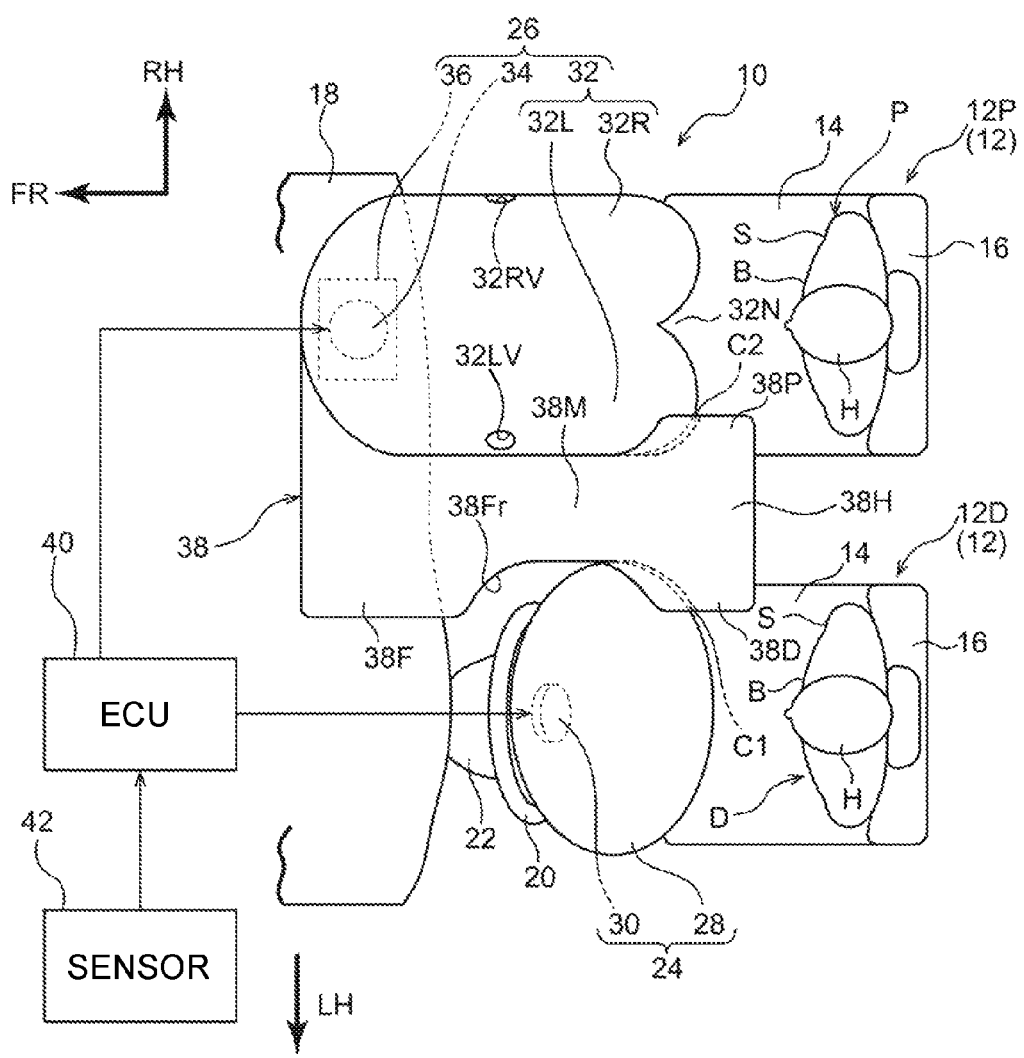
FIG. 1 is a plan view illustrating an overall outline configuration of a vehicle airbag system according to an exemplary embodiment.

FIG. 1 is a plan view schematically illustrating part of the automobile V applied with the vehicle airbag system 10, including a front section inside a cabin C. Note that in FIG. 1, a driver seat airbag 28, a front passenger seat airbag 32, and a center airbag 38, described later, are each illustrated in an inflated and deployed state. As illustrated in FIG. 1, a left and right pair of vehicle seats 12, each serving as a seat, are disposed side-by-side on the left and right inside the cabin C. Each vehicle seat 12 is configured including a seat cushion 14, and a seatback 16 that has a lower end connected to a rear end of the seat cushion 14.

In the present exemplary embodiment, the vehicle seat 12 positioned at the left side of a vehicle width direction center line (not illustrated in the drawings) of the vehicle body is a driver seat 12D, and the vehicle seat 12 at the right side of the center line is a front passenger seat 12P. Although not illustrated in the drawings, a center console is disposed between the driver seat 12D and the front passenger seat 12P. Namely, the automobile V applied with the vehicle airbag system 10 according to the present exemplary embodiment is configured such that there is no center seat disposed between the driver seat 12D and the front passenger seat 12P. A shift knob SK (see FIG. 2B) is provided on the center console. Note that a configuration that does not include the center console may be applied (such as a configuration that may have an aisle between the left and right vehicle seats 12). In such cases, the shift knob SK may, for example, be provided to an instrument panel 18, described later.

A front end of the above-described center console is linked to a vehicle width direction center portion of the instrument panel 18, which extends along the vehicle width direction in front of the driver seat 12D and the front passenger seat 12P. A steering wheel 20 is disposed at the driver seat 12D side of the instrument panel 18 in the vehicle width direction. The steering wheel 20 is supported by a steering column 22 so as to be disposed at the driver seat 12D side (rear) of the instrument panel 18 in the front-rear direction.

In the automobile V, the driver seat 12D and the front passenger seat 12P are each provided with an occupant restraint seatbelt device (not illustrated in the drawings). In the present exemplary embodiment, the seatbelt belt devices of the vehicle seat 12 and the front passenger seat 12P are both three-point seatbelt devices. An occupant D (hereafter referred to as "driver D") of the driver seat 12D and an occupant P (hereafter referred to as "front passenger seat occupant P") of the front passenger seat 12P each have their lumbar region restrained by a lap belt, and their upper body restrained by a shoulder belt in the respective driver seat 12D and front passenger seat 12P.

Figure 2A:
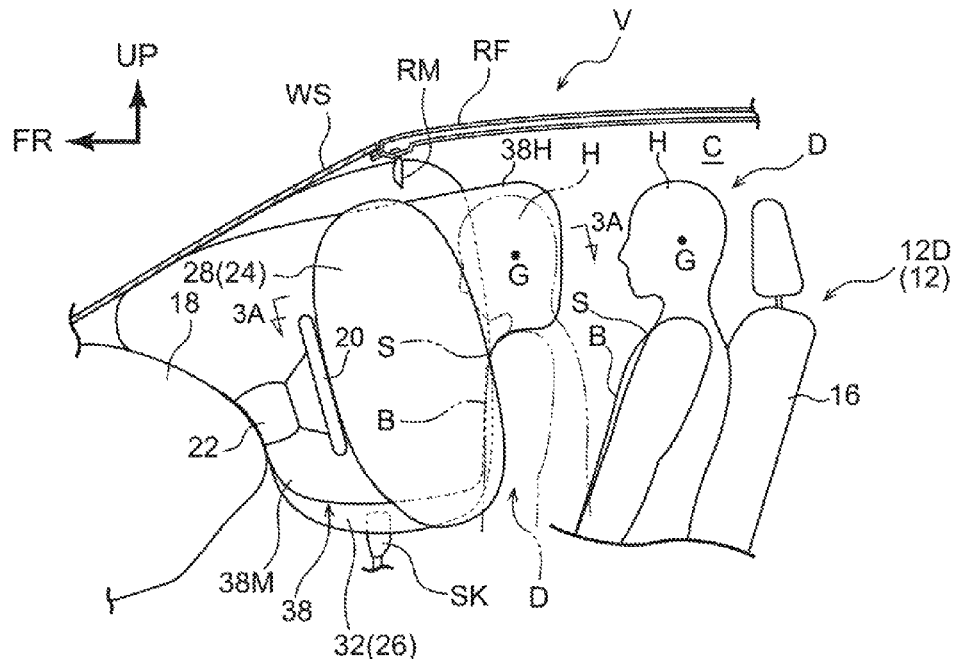
FIG. 2A is a side view schematically illustrating an occupant protection mode by a vehicle airbag system according to an exemplary embodiment, illustrating a protection mode of a driver seat occupant.
Figure 2B:
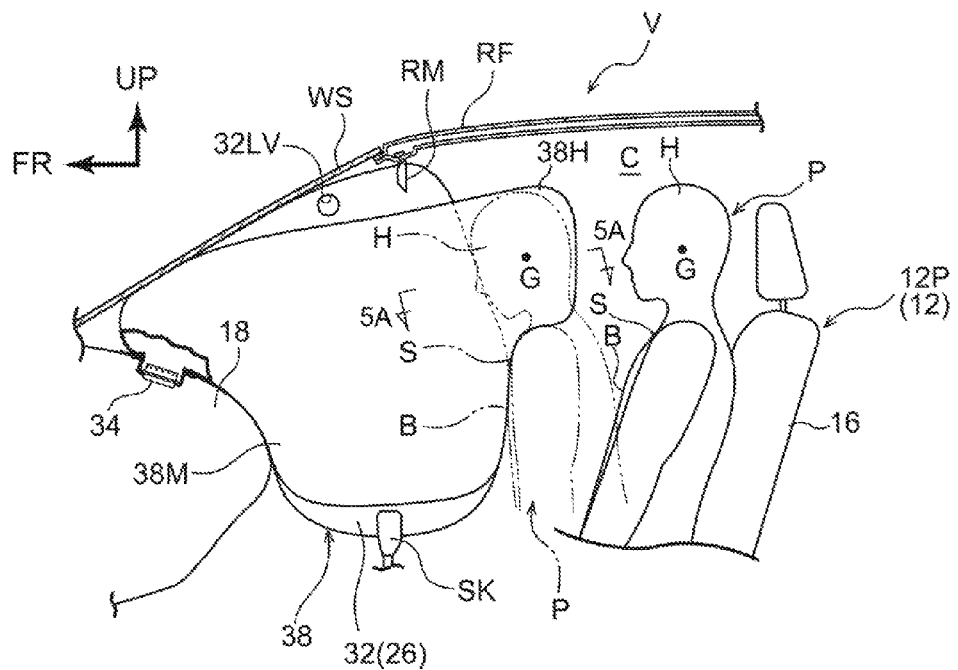
FIG. 2B is a side view schematically illustrating an occupant protection mode by a vehicle airbag system according to an exemplary embodiment, illustrating a protection mode of a front passenger seat occupant.

As illustrated in FIGS. 2A, 2B, a rear-view mirror RM is provided in front of and above the vehicle seats 12 inside the cabin C. The rear-view mirror RM is disposed at a vehicle width direction center portion of an upper portion of a windshield WS, or of a front end of a roof RF.

Front Seat Airbag System

As illustrated in FIG. 1, the vehicle airbag system 10 includes a driver seat airbag device 24 in order to protect the driver D in a head-on collision. The vehicle airbag system 10 also includes a front passenger seat airbag device 26 in order to protect the front passenger seat occupant P in a head-on collision.

Driver Seat Airbag Device

The driver seat airbag device 24 is provided inside a rear end portion of the steering column 22 at a center portion of the steering wheel 20. The driver seat airbag device 24 includes the driver seat airbag 28 serving as a first airbag, an inflator 30 serving as a gas supply device, and an airbag case, not illustrated in the drawings. The driver seat airbag 28 is folded in a state with the inflator 30 embedded inside a base end portion thereof, and is stowed together with the inflator 30 inside the airbag case.

The airbag case in which the driver seat airbag 28 and the inflator 30 thus configure a module is housed in the rear end portion of the steering column 22. Rearward facing opening portions of the airbag case and the steering column 22 are closed off by a steering wheel pad, not illustrated in the drawings.

The driver seat airbag device 24 is configured such that, when the inflator 30 is actuated by an airbag ECU 40, described later, the driver seat airbag 28 is supplied with gas generated by the inflator 30 and is inflated and deployed at a front face of the driver seat 12D (the driver D). The driver seat airbag 28 causes the steering wheel pad to rupture accompanying inflation and deployment, and is inflated and deployed at the driver seat 12D side of the steering wheel 20.

As viewed by the driver D, the driver seat airbag 28 is inflated and deployed in a circular shape, and is capable of restraining the head H and the chest B of the driver D in the inflated and deployed state. In side view as illustrated in FIG. 2A, the driver seat airbag 28 has an elliptical shape with length from top to bottom in the inflated and deployed state, and is inclined along the steering wheel 20 with respect to the up-down direction. Note that the inflated and deployed shape of the driver seat airbag 28 explained herein is an inflated and deployed shape in a non-restraining (not restraining) inflated and deployed state, this being a state in which the driver D is not restrained.

General Configuration of Front Passenger Seat Airbag

The front passenger seat airbag device 26 is provided inside the instrument panel 18, in front of the front passenger seat 12P. The front passenger seat airbag device 26 includes the front passenger seat airbag 32 serving as a first airbag, an inflator 34 serving as a gas supply device, and an airbag case 36. The front passenger seat airbag 32 is folded in a state with the inflator 34 embedded inside a base end portion thereof, and is stowed together with the inflator 34 inside the airbag case 36.

The airbag case 36 in which the front passenger seat airbag 32 and the inflator 34 thus configure a module is supported by instrument panel reinforcement or the like, not illustrated in the drawings, inside the instrument panel 18. An airbag door is formed in a portion of the instrument panel 18 that covers the airbag case 36.

The front passenger seat airbag device 26 is configured such that, when the inflator 34 is actuated by the airbag ECU 40, described later, the front passenger seat airbag 32 is supplied with gas generated by the inflator 34 and is inflated and deployed at a front face of the front passenger seat 12P (the front passenger seat occupant P). The front passenger seat airbag 32 causes the airbag door (the instrument panel 18) to rupture accompanying inflation and deployment, and is inflated and deployed at the front passenger seat 12P side of the instrument panel 18.

Explanation follows regarding the inflated and deployed shape (form) of the front passenger seat airbag 32. Note that the inflated and deployed shape described below is an inflated and deployed shape in a non-restraining (not restraining) inflated and deployed state, this being a state in which the front passenger seat occupant P is not restrained. As illustrated in FIG. 1, the front passenger seat airbag 32 includes a left bag 32L and a right bag 32R, and is configured so as to inflate and deploy in a shape that substantially has left-right symmetry in plan view. The left bag 32L and the right bag 32R are each formed in a bag shape, are connected to each other, and are placed in communication with each other at the front side at least.

The left bag 32L and the right bag 32R are thereby supplied with gas from a common inflator 34, and are inflated and deployed as a single front passenger seat airbag 32. Namely, the front passenger seat airbag 32 is what is referred to as a twin chamber type airbag. Note that a single chamber type airbag may be adopted as the front passenger seat airbag 32 instead of the twin chamber type described above.

Configuration is such that when a boundary line between the left bag 32L and the right bag 32R, namely, a vehicle width direction center line of the front passenger seat airbag 32, is extended, the extended line is substantially aligned with a seat width (vehicle width) direction center line (not illustrated in the drawings) of the front passenger seat 12P. In the inflated and deployed state, a rear end of the left bag 32L is positioned in front of the left shoulder of the front passenger seat occupant P, and a rear end of the right bag 32R is positioned in front of the right shoulder of the front passenger seat occupant P. A recessed portion 32N formed between the rear ends of the left bag 32L and the right bag 32R is positioned in front of the head H of the front passenger seat occupant P. In the present exemplary embodiment, placement of the inflator 34 is such that the vehicle width direction center line of the inflator 34 itself is substantially aligned with the vehicle width direction center line of the front passenger seat airbag 32 in the fully inflated and deployed state.

As illustrated in FIG. 1, internal pressure adjustment vent holes 32LV, 32RV are respectively formed in the left bag 32L and the right bag 32R of the front passenger seat airbag 32. The vent hole 32RV of the right bag 32R is formed in a substantially up-down direction center portion of a side wall facing the vehicle width direction outside. The vent hole 32LV of the left bag 32L is formed in an upper portion (a portion positioned further toward the upper side than an upper end of the center airbag 38) of a side wall facing the vehicle width direction center side.

The front passenger seat airbag device 26 also includes the center airbag 38 serving as a second airbag. Specific explanation follows below.

Center Airbag

The center airbag 38 of the present exemplary embodiment is folded (not illustrated in the drawings) together with the front passenger seat airbag 32, and stowed (not illustrated in the drawings) together with the front passenger seat airbag 32 inside the airbag case 36. Configuration is such that, when the inflator 34 is actuated by the airbag ECU 40, described later, the center airbag 38 is supplied with gas generated by the inflator 34, and is inflated and deployed. Note that vent holes are not set in the center airbag 38.

Inflated and Deployed Shape

As illustrated in plan view in FIG. 1, configuration is such that the center airbag 38 is inflated and deployed in a form that is adjacent to the front passenger seat airbag 32, at the vehicle width direction center side, namely, the driver seat airbag 28 side, of the front passenger seat airbag 32. The center airbag 38 may be a bag body that is independent of the front passenger seat airbag 32, or may form a single bag body with the front passenger seat airbag 32 (left bag 32L). In the latter case, there is sometimes no clear boundary present between the center airbag 38 and the front passenger seat airbag 32 (left bag 32L).

In the below explanation, unless specifically stated otherwise, explanation regarding the shape of the center airbag 38 refers to a shape in a non-restraining (not restraining) inflated and deployed state, this being a state in which neither the driver D nor the front passenger seat occupant P are restrained. In the below explanation, the driver D and the front passenger seat occupant P are sometimes referred to as "occupant", without distinguishing therebetween.

As illustrated in FIG. 2B, the center airbag 38 is configured including a main body section 38M that has a similar shape to the front passenger seat airbag 32 in side view, and a head restraint section 38H that projects out toward the rear from an upper rear end of the main body section 38M. The main body section 38M and the head restraint section 38H are inflated and deployed between the driver seat 12D and the front passenger seat 12P, and are examples of a main deployment section of the present invention. As illustrated in FIG. 1, the center airbag 38 is configured including a pair of overhanging deployment sections 38D, 38P that respectively jut out from the head restraint section 38H toward the driver seat 12D side and the front passenger seat 12P side, and an overhanging deployment section 38F that juts out from a front portion of the main body section 38M toward the driver seat 12D side. Specific explanation follows below.

As illustrated in FIG. 2B, the front-rear direction position of a rear end of the main body section 38M is substantially aligned with the front-rear direction position of a rear end of the front passenger seat airbag 32. A rear end face of the main body section 38M configures a face that contacts the upper body, including the shoulders S, of the respective occupant (see FIGS. 2A, 2B). In the present exemplary embodiment, the rear end face of the main body section 38M restrains the shoulders S and the chest B of the driver D or the front passenger seat occupant P in an oblique collision or a small overlap collision, described later. An upper end of the main body section 38M, namely, the center airbag 38, is set lower than an upper end of the front passenger seat airbag 32. Specifically, the center airbag 38 is configured so as not to impinge on the rear-view mirror RM. A lower end of the center airbag 38 is configured so as not to impinge on the shift knob SK in the inflated and deployed state.

The head restraint section 38H projects out toward the rear from the upper side of a portion of the main body section 38M that contacts the upper body of the respective occupant, and restrains the head H of the occupant from the vehicle width direction center side. Specifically, in the head restraint section 38H, the overhanging deployment section 38D that juts out toward the driver seat 12D side contacts the head H of the driver D, and restrains their head H. Also in the head restraint section 38H, the overhanging deployment section 38P that juts outs toward the front passenger seat 12P side contacts the head H of the front passenger seat occupant P, and restrains their head H.

In the present exemplary embodiment, the head restraint section 38H projects out from the main body section 38M toward the rear so as to be contacted from the vehicle width direction outside by the head H of the respective occupant, which moves toward the vehicle width direction center side in an oblique direction with respect to the vehicle body in an oblique collision or a small overlap collision, described later. More specifically, the head restraint section 38H projects out further rearward than a center of gravity G of the head H of the respective occupant (see FIGS. 2A, 2B) when the head H is contacted (starts to be restrained) by the overhanging deployment section 38D, 38P in an oblique collision mode, described later. Note that a restraint mode of the head H by the head restraint section 38H is described later, together with operation of the present exemplary embodiment.

Figure 3A:
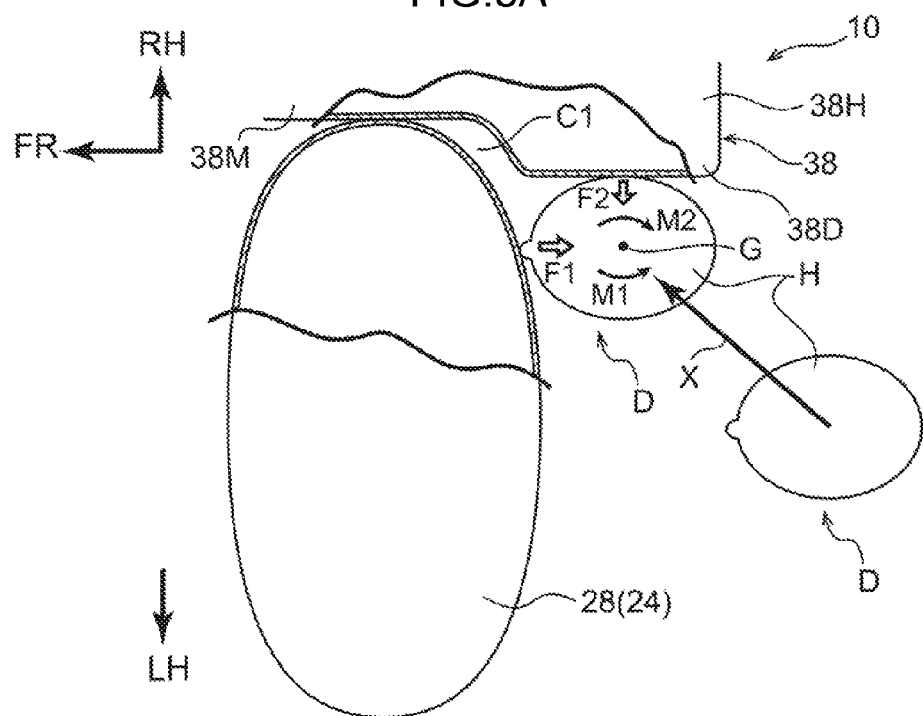
FIG. 3A is a cross-section for explaining a protection operation of a driver by an overhanging deployment section of a vehicle airbag system according to an exemplary embodiment, taken along line 3A-3A in FIG. 2A and schematically illustrating the exemplary embodiment.

As illustrated in FIG. 1, the overhanging deployment section 38D is superimposed on an end portion at the vehicle width direction center side of the driver seat airbag 28 in plan view. As illustrated in FIG. 3A, which illustrates a cross-section (partial cross-section) along 3A-3A in FIG. 2A, the overhanging deployment section 38D faces a portion of the driver seat airbag 28, which restrains the head H of the driver D, from the rear across a gap C1, which is smaller than the size of the head H. In other words, the overhanging deployment section 38D is configured so as to be inflated and deployed jutting out from the head restraint section 38H toward the vehicle width direction outside, so as to cover (overlap in the vehicle width direction) the end portion at the vehicle width direction center side of the driver seat airbag 28 from the rear. In other words, the overhanging deployment section 38D is configured so as to be inflated and deployed jutting out beside the driver seat airbag 28, so as to be positioned at the vehicle rear side of the driver seat airbag 28, and to cover the vehicle width direction end portion of the driver seat airbag 28 from the vehicle rear. A vehicle width direction outside face (a wall portion that the head H of the driver D contacts) of the overhanging deployment section 38D is a substantially planar face running along the up-down direction and the front-rear direction. A front portion of the overhanging deployment section 38D that faces the gap C1 has an arc shape running along an outer periphery of the driver seat airbag 28.

Figure 5A:
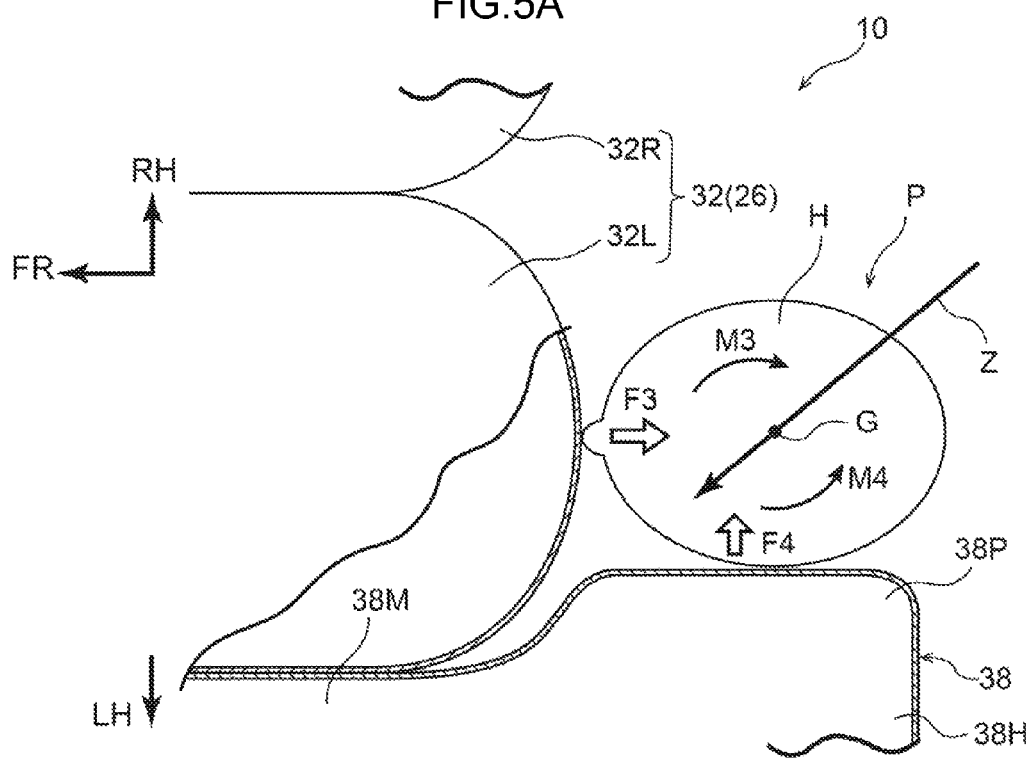
FIG. 5A is a cross-section for explaining a protection operation of a front passenger seat occupant by an overhanging deployment section of a vehicle airbag system according to an exemplary embodiment, taken along line 5A-5A in FIG. 2B, schematically illustrating the exemplary embodiment.

As illustrated in FIG. 1, the overhanging deployment section 38P is superimposed on an end portion at the vehicle width direction center side of the front passenger seat airbag 32 in plan view. As illustrated in FIG. 5A, which illustrates a cross-section (partial cross-section) along 5A-5A in FIG. 2B, the overhanging deployment section 38P faces a portion of the front passenger seat airbag 32, which restrains the head H of the front passenger seat occupant P, from the rear across a gap C2, which is smaller than the size of the head H. In other words, the overhanging deployment section 38P is configured so as to be inflated and deployed jutting out from the head restraint section 38H toward the vehicle width direction outside, so as to cover (overlap in the vehicle width direction) the end portion at the vehicle width direction center side of the front passenger seat airbag 32 from the rear. In other words, the overhanging deployment section 38P is configured so as to be inflated and deployed jutting out beside the front passenger seat airbag 32, so as to be positioned at the vehicle rear side of the front passenger seat airbag 32, and to cover the vehicle width direction end portion of the front passenger seat airbag 32 from the vehicle rear. A vehicle width direction outside face (a wall portion that the head H of the front passenger seat occupant P contacts) of the overhanging deployment section 38P is a substantially planar face running along the up-down direction and the front-rear direction. A front portion of the overhanging deployment section 38P that faces the gap C2 has an arc shape running along an outer periphery of the front passenger seat airbag 32.

As illustrated in FIG. 1, the overhanging deployment section 38F, serving as a front side overhanging deployment section, is configured so as to be inflated and deployed jutting out from the front portion of the main body portion 38M toward the vehicle width direction outside, so as to cover (overlap in the vehicle width direction) the end portion at the vehicle width direction center side of the driver seat airbag 28 from the front. In the present exemplary embodiment, a rearward facing face 38Fr of the overhanging deployment section 38F is positioned in the vicinity of a rim portion of the steering wheel 20 in plan view.

The center airbag 38 in the non-restraining state accordingly has a deployed form (shape) that does not impinge on the driver seat airbag 28 in the non-restraining state. Namely, the center airbag 38 and the driver seat airbag 28 are configured so as to not influence the inflation and deployment (shape and orientation) of each other.

Airbag ECU

The vehicle airbag system 10 also includes the airbag ECU 40, serving as a controller. The airbag ECU 40 is electrically connected to a collision sensor (or a set of sensors) 42. The airbag ECU 40 is also electrically connected to the inflator 30 of the driver seat airbag device 24, and the inflator 34 of the front passenger seat airbag device 26, respectively.

The airbag ECU 40 is capable of detecting or predicting (the occurrence or the inevitability of) various types of head-on collisions of the automobile V to which it is applied based on information from the collision sensor 42, without distinguishing therebetween (or distinguishing between collision forms). The airbag ECU 40 actuates the inflators 30, 34 on detecting or predicting a head-on collision based on the information from the collision sensor 42. Note that the head-on collision forms when the airbag ECU 40 actuates the inflators 30, 34 include head-on collisions in positions offset to one vehicle width direction side, such as oblique collisions and small overlap collisions.

Note that an oblique collision (oblique MDB collision, oblique collision) is a collision obliquely from the front, for example, as defined by NHSTA (for example, a collision at a relative angle of 15°, and with a vehicle width direction overlap amount of approximately 35% with respect to a collision counterpart). In the present exemplary embodiment, as an example, an oblique collision at a relative speed of 90 km/hr is envisaged. A small overlap collision is a head-on collision of the automobile V in which, for example, the vehicle width direction overlap amount with the collision counterpart is 25% or less, as defined by IIHS. For example, a collision at the vehicle width direction outside of a front side member, this being a vehicle body frame, corresponds to a small overlap collision. In the present exemplary embodiment, as an example, a small overlap collision at a relative speed of 64 km/hr is envisaged.

Operation

Explanation follows regarding operation of the present exemplary embodiment.

The airbag ECU 40 actuates the inflators 30, 34 on detecting or predicting a head-on collision of the automobile V based on a signal from the collision sensor 42. When this is performed, the driver seat airbag 28 is supplied with gas from the inflator 30, and is inflated and deployed while rupturing the steering wheel pad.

The front passenger seat airbag 32 is supplied with gas from the inflator 34, and is inflated and deployed while rupturing the airbag door set in the instrument panel 18. The center airbag 38 is supplied with gas from the inflator and is inflated and deployed together with the front passenger seat airbag 32 from inside the instrument panel 18 toward the cabin C.

Oblique Collision or Small Overlap Collision at Front Passenger Seat Side

In cases in which a head-on collision of the automobile V is an oblique collision or a small overlap collision at the front passenger seat 12P side (right side), the driver D and the front passenger seat occupant P move toward the right side, this being the collision side of the vehicle body in the vehicle width direction, while moving forward. Note that the forward movement of the driver D and the front passenger seat occupant P, each wearing the three-point seatbelt device as described previously, takes a form of tilting forward about the lumbar region.

In such cases, the front passenger seat occupant P is limited from moving toward the collision side in the vehicle width direction while moving forward with respect to the vehicle body, by the front passenger seat airbag 32 and other protection devices (such as a curtain airbag device or a side airbag device), not illustrated in the drawings. In other words, the front passenger seat occupant P is restrained from moving obliquely forward toward the collision side by the front passenger seat airbag 32 and the other protection devices.

The driver D is limited from moving toward the collision side in the vehicle width direction while moving forward by the driver seat airbag 28 and the center airbag 38. In other words, the driver D is restrained from moving obliquely forward toward the collision side by the driver seat airbag 28 and the center airbag 38. The vehicle airbag system 10 thereby enables the driver D to be well protected in an oblique collision or a small overlap collision, compared to configurations that do not include the center airbag 38.

Suppressing Rotation of Head of Driver

In the vehicle airbag system 10, when the driver D is restrained by the driver seat airbag 28 and the center airbag 38, their head H is suppressed from mainly rotating about the up-down direction axis. Specific explanation follows below, with comparison to a comparative form.

Figure 3B:
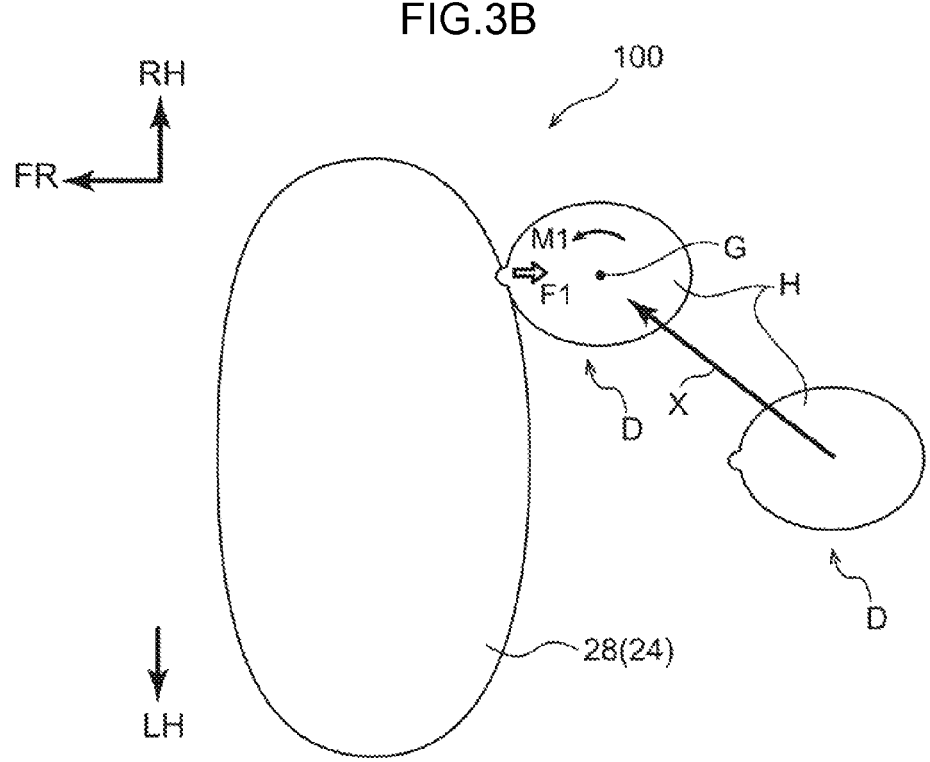
FIG. 3B is a plan view for explaining a protection operation of a driver by an overhanging deployment section of a vehicle airbag system according to an exemplary embodiment, schematically illustrating a comparative mode.
Figure 4:
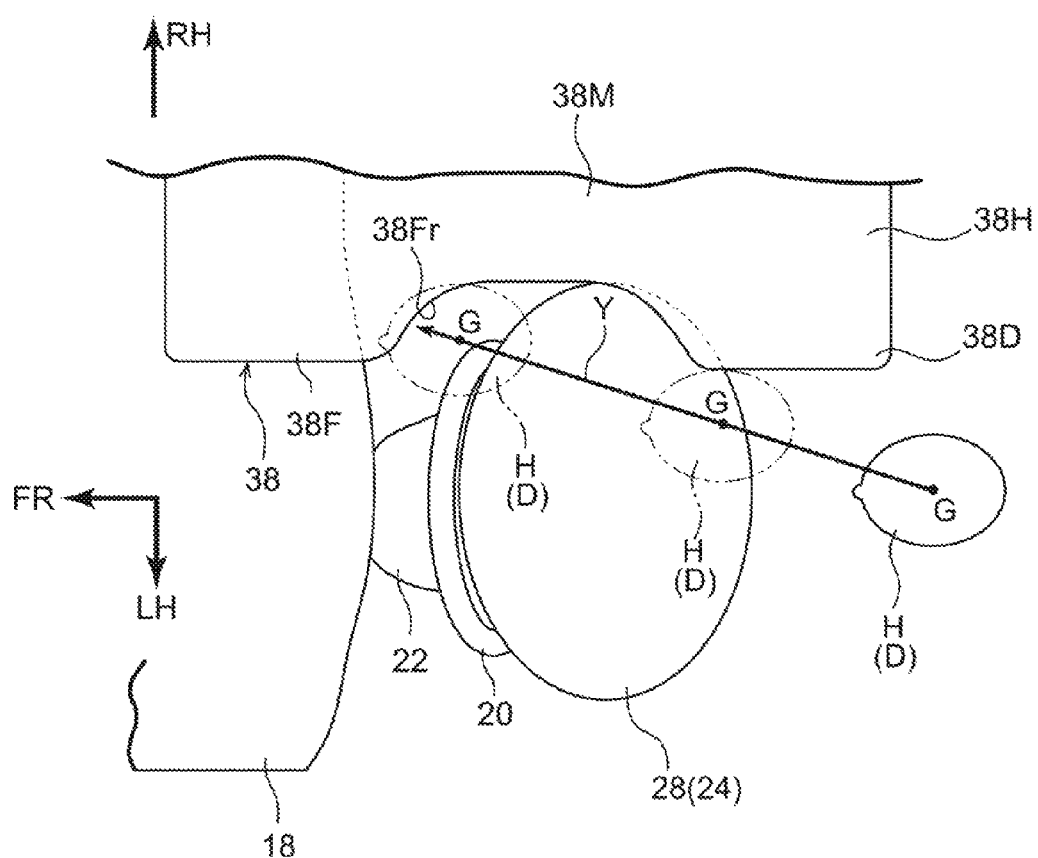
FIG. 4 is a plan view for explaining a protection operation of a driver by an overhanging deployment section at the front side of a vehicle airbag system according to an exemplary embodiment.

A vehicle airbag system 100 illustrated in FIG. 3B does not include a center airbag 38. In this case, the head H of the driver D that is moving obliquely forward toward the collision side contacts a portion at the vehicle width direction center side of the driver seat airbag 28, and bears a rearward reaction force F1. A counterclockwise moment M1 causing a rear portion of the head H to face the collision side acts on the head H, due to the difference between the reaction force direction and the movement direction of the head H. In other words, although forward movement of the head H at the contact location with the driver seat airbag 28 is limited, inertia obliquely toward the front (the arrow X direction) due to the collision continues to act on the center of gravity G of the head H. The head H is thereby rotated with respect to the contact location with the driver seat airbag 28 toward the direction of shift in the center of gravity G toward the collision side.

In contrast thereto, the vehicle airbag system 10 includes the center airbag 38. Thus, as illustrated in FIG. 3A, the head H of the driver D moving obliquely forward toward the collision side contacts the portion at the vehicle width direction center side of the driver seat airbag 28, and the head restraint section 38H of the center airbag 38. When this occurs, the head H that has contacted the head restraint section 38H bears a reaction force F2 toward the collision opposite side. A clockwise moment M2 causing the rear portion of the head H to face the collision opposite side acts on the head H, due to the difference between the reaction force direction and the movement direction of the head H. Namely, the moment M2 acts in a direction that cancels out the moment M1 occurring due to contact with the driver seat airbag 28. Thus the vehicle airbag system 10 including the center airbag 38 enables rotation of the head H of the driver D accompanying restraint of the head H to be suppressed, compared to the above comparative form in which the center airbag 38 is not provided.

Moreover, the overhanging deployment section 38D juts out from the head restraint section 38H toward the driver seat 12D side. The timing at which the head H of the driver D that is moving forward toward the collision side contacts the head restraint section 38H of the center airbag 38 is thereby earlier than in configurations that do not include the overhanging deployment section 38D. The difference between the timing at which the head H of the driver D that is moving obliquely forward toward the collision side contacts the portion at the vehicle width direction center side of the driver seat airbag 28, and the timing at which the head H contacts the head restraint section 38H of the center airbag 38, is thereby suppressed to a minimum. In other words, the duration in which the head H contacts only the end portion at the vehicle width direction center side of the driver seat airbag 28 (the moment M2 does not act) is shorter than in configurations that do not include the overhanging deployment section 38D, or this duration is eliminated. This enables the rotation of head H of the driver D to be effectively suppressed.

Moreover, the gap C1 is formed between the overhanging deployment section 38D and the driver seat airbag 28, such that the head H of the driver D presses open the gap C1, and further moves obliquely forward toward the collision side. Both left and right side portions of the head H accordingly contact (so as to be enveloped by) the driver seat airbag 28 and the center airbag 38 over a wide surface area, enabling the rotation of the head H of the driver D to be even more effectively suppressed.

Furthermore, in an oblique collision or a small overlap collision, as illustrated in FIG. 2A, the shoulders S and the chest B of the driver D are restrained by the driver seat airbag 28 and the main body section 38M of the center airbag 38, while the head H of the driver D is restrained by the head restraint section 38H. Note that, since the driver seat airbag 28 and the main body section 38M are positioned further forward than the head restraint section 38H, the head H and the shoulders S of the driver D are (start to be) restrained simultaneously, or with an extremely small time difference. Inertia energy of the driver D is thereby absorbed at the head H and the shoulders S at the same stage, and the rotation of the head H is even more effectively suppressed.

In the vehicle airbag system 10, the center airbag 38 includes the overhanging deployment section 38F that is inflated and deployed so as to cover the end portion at the vehicle width direction center side of the driver seat airbag 28 from the front. Thus when the driver D is restrained by the driver seat airbag 28 and the center airbag 38 as described above, the overhanging deployment section 38F is present between the end portion at the vehicle width direction center side of the driver seat airbag 28, and the instrument panel 18. Namely, reaction force accompanying restraint of the driver D by the driver seat airbag 28 is supported by the instrument panel 18 through the overhanging deployment section 38F, and tilting of the driver seat airbag that is in contact with the driver D is suppressed. This enables improved performance in protecting the head of the occupant in an oblique collision or a small overlap collision toward the front passenger seat side, compared to configurations that do not include the overhanging deployment section 38F.

Suppressing a Collision Between Head of Driver and Instrument Panel

As described above, the driver D is restrained by the driver seat airbag 28 and the center airbag 38 in an oblique collision toward the front passenger seat 12P side. Note that, as illustrated by the imaginary lines and arrow Y in FIG. 4, it is conceivable that the head H slips through between the driver seat airbag 28 and the center airbag 38, depending on the oblique collision mode (collision angle and speed). In such cases, the head H contacts the face 38Fr of the overhanging deployment section 38F of the center airbag 38. Namely, a front portion of the center airbag 38 is present between the head H of the driver D and the instrument panel 18, contributing to absorbing energy of the head H that is moving toward the instrument panel 18. This enables reaction force from the instrument panel 18 borne by the head H, namely, the injury criterion with respect to the head H, to be reduced compared to configurations that do not include the overhanging deployment section 38F.

Oblique Collision or Small Overlap Collision at Driver Seat Side

In cases in which a head-on collision of the automobile V is an oblique collision or a small overlap collision at the driver seat 12D side (left side), the driver D and the front passenger seat occupant P move toward the left side, this being the collision side of the vehicle body in the vehicle width direction, while moving forward. Note that the forward movement of the driver D and the front passenger seat occupant P each wearing the three-point seatbelt device as described above takes a form of tilting forward about the lumbar region.

In such cases, the driver D is limited from moving toward the collision side in the vehicle width direction while moving forward with respect to the vehicle body, by the driver seat airbag 28 and the other protection devices (such as a curtain airbag device or a side airbag device), not illustrated in the drawings. In other words, the driver D is restrained from moving obliquely forward toward the collision side by the driver seat airbag 28 and the other protection devices.

The front passenger seat occupant P is limited from moving toward the collision side in the vehicle width direction while moving forward by the front passenger seat airbag 32 and the center airbag 38. In other words, the front passenger seat occupant P is restrained from moving obliquely forward toward the collision side by the front passenger seat airbag 32 and the center airbag 38. The vehicle airbag system 10 thereby enables the front passenger seat occupant P to be well protected in an oblique collision or a small overlap collision, compared to configurations that do not include the center airbag 38.

Suppressing Rotation of Head of Front Seat Passenger

In the vehicle airbag system 10, when the front passenger seat occupant P is restrained by the front passenger seat airbag 32 and the center airbag 38, their head H is suppressed from mainly rotating about the up-down direction axis. Specific explanation follows below, with comparison to a comparative form.

Figure 5B:
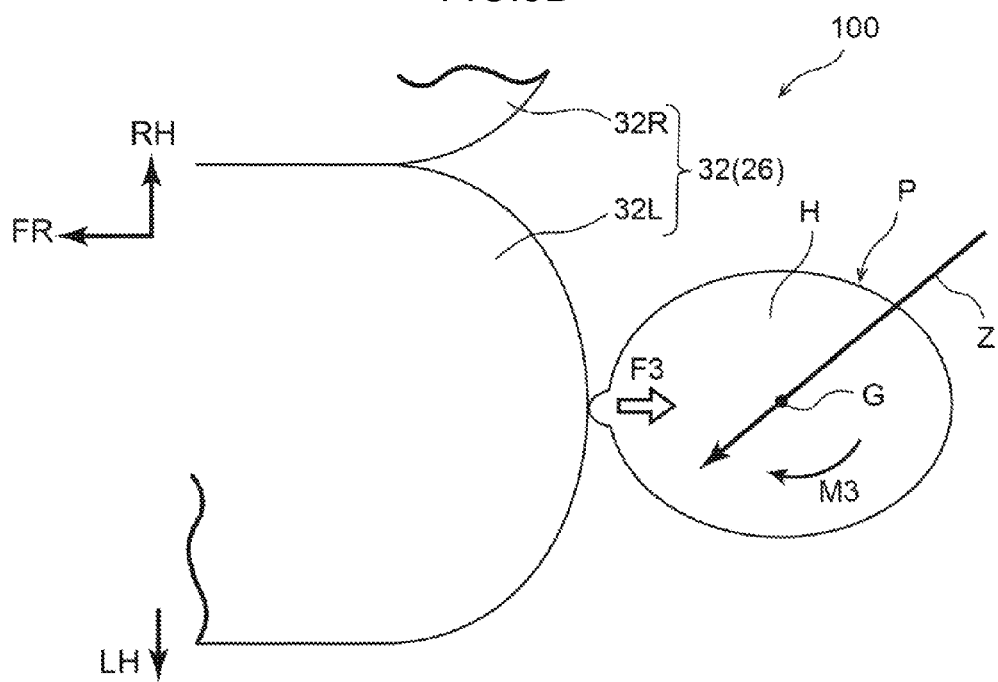
FIG. 5B is a plan view for explaining a protection operation of a front passenger seat occupant by an overhanging deployment section of a vehicle airbag system according to an exemplary embodiment, schematically illustrating a comparative form.

A vehicle airbag system 100 illustrated in FIG. 5B does not include a center airbag 38. In this case, the head H of the front passenger seat occupant P that is moving obliquely forward toward the collision side contacts a portion at the vehicle width direction center side of the front passenger seat airbag 32, and bears a rearward reaction force F3. A clockwise moment M3 causing a rear portion of the head H to face the collision side acts on the head H, due to the difference between the reaction force direction and the movement direction of the head H. In other words, although forward movement of the head H at the contact location with the front passenger seat airbag 32 is limited, inertia obliquely toward the front (the arrow Z direction) due to the collision continues to act on the center of gravity G of the head H. The head H is thereby rotated with respect to the contact location with the front passenger seat airbag 32 in the direction the center of gravity G is shifted toward the collision side.

In contrast thereto, the vehicle airbag system 10 includes the center airbag 38. Thus, the head H of the front passenger seat occupant P moving obliquely forward toward the collision side contacts the portion at the vehicle width direction center side of the front passenger seat airbag 32 and the head restraint section 38H of the center airbag 38. When this occurs, as illustrated in FIG. 5A, the head H that has contacted the head restraint section 38H bears a reaction force F4 toward the collision opposite side. A counterclockwise moment M4 causing the rear portion of the head H to face the collision opposite side acts on the head H, due to the difference between the reaction force direction and the movement direction of the head H. Namely, the moment M4 acts in a direction that cancels out the moment M3 occurring due to contact with the front passenger seat airbag 32. Thus, the vehicle airbag system 10 including the center airbag 38 enables rotation of the head H of the front passenger seat occupant P accompanying restraint of the head H to be suppressed, compared to the above comparative form in which the center airbag 38 is not provided.

Moreover, the overhanging deployment section 38P juts out from the head restraint section 38H toward the front passenger seat 12P side. The timing at which the head H of the front passenger seat occupant P that is moving obliquely forward toward the collision side contacts the head restraint section 38H of the center airbag 38 is thereby earlier than in configurations that do not include the overhanging deployment section 38P. The difference between the timing at which the head H of the front passenger seat occupant P that is moving forward toward the collision side contacts the portion at the vehicle width direction center side of the front passenger seat airbag 32, and the timing at which the head H contacts the head restraint section 38H of the center airbag 38, is thereby suppressed to a minimum. In other words, the duration in which the head H contacts only the end portion at the vehicle width direction center side of the front passenger seat airbag 32 (the moment M4 does not act) is shorter than in configurations that do not include the overhanging deployment section 38P, or this duration is eliminated. This enables the rotation of the head H of the front passenger seat occupant P to be effectively suppressed.

Moreover, the gap C2 is formed between the overhanging deployment section 38P and the front passenger seat airbag 32, such that the head H of the front passenger seat occupant P presses open the gap C2, and further moves obliquely forward toward the collision side. Both left and right side portions of the head H accordingly contact (so as to be enveloped by) the front passenger seat airbag 32 and the center airbag 38 over a wide surface area, enabling the rotation of the head H of the front passenger seat occupant P to be even more effectively suppressed.

Furthermore, in an oblique collision or a small overlap collision, as illustrated in FIG. 2B, the shoulders S and the chest B of the front passenger seat occupant P are restrained by the front passenger seat airbag 32 and the main body section 38M of the center airbag 38, while the head H of the front passenger seat occupant P is restrained by the head restraint section 38H. Note that, since the front passenger seat airbag 32 and the main body section 38M are positioned further forward than the head restraint section 38H, the head H and the shoulders S of the front passenger seat occupant P are (start to be) restrained simultaneously, or with an extremely small time difference. Inertia energy of the front passenger seat occupant P is thereby absorbed at the head H and the shoulders S at the same stage, and the rotation of the head H is even more effectively suppressed.

Modified Example

Figure 6:
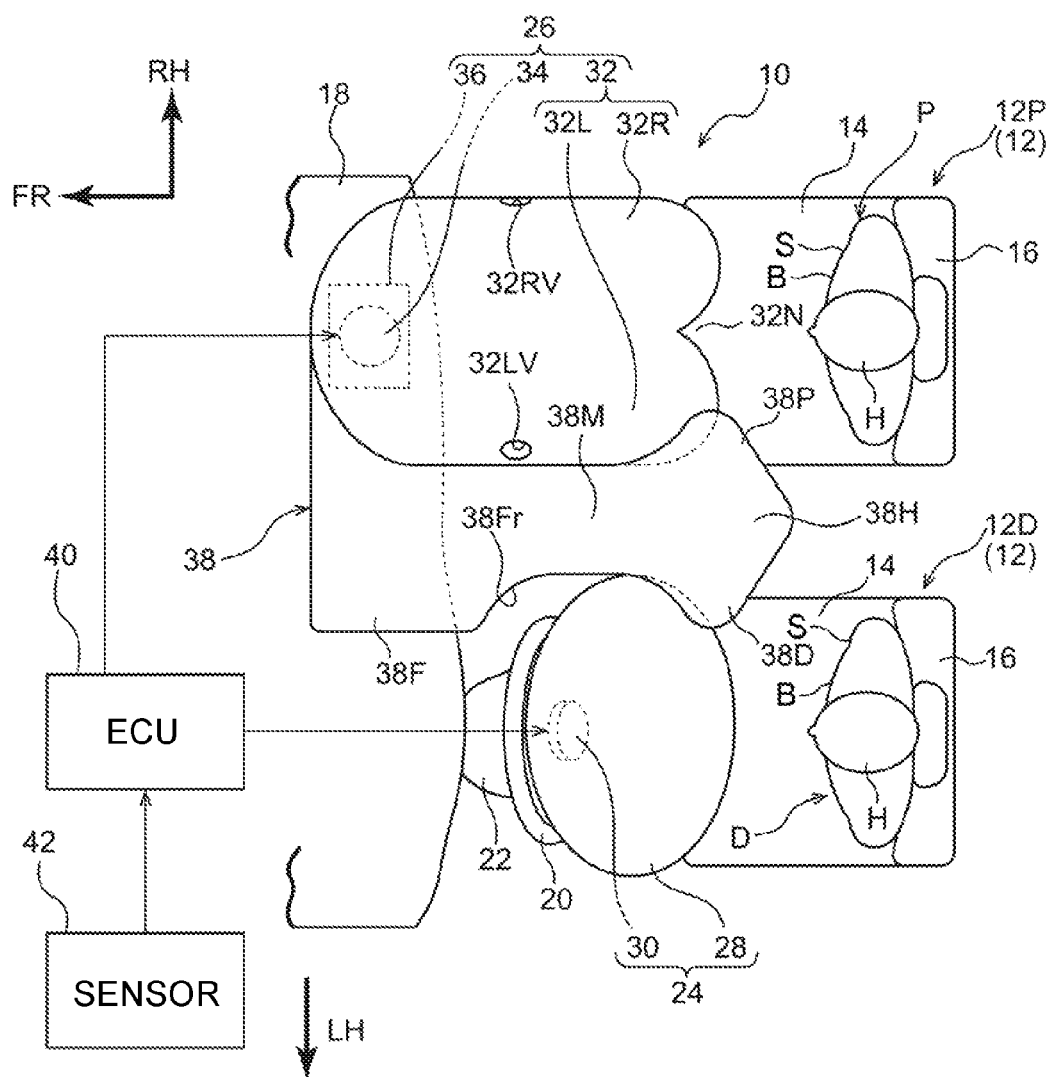
FIG. 6 is a plan view illustrating an overall outline configuration of a vehicle airbag system according to a modified example of an exemplary embodiment.

Note that an example has been explained in the above exemplary embodiment in which the vehicle width direction outside faces of the overhanging deployment sections 38D, 38P are substantially planar faces running along the up-down direction and the front-rear direction; however, the present invention is not limited thereto. As illustrated in FIG. 6, for example, the vehicle width direction outside faces (the wall portions that the respective heads H of the driver D and the front passenger seat occupant P contact) of the overhanging deployment sections 38D, 38P may each be a protruding face (protruding wall portion) that protrudes outward in the vehicle width direction in plan view. In other words, the center airbag 38 according to the modified example is configured such that both vehicle width direction corner portions at a rear end side are cut away, in contrast to the center airbag 38 according to the above exemplary embodiment. The airbag 38 according to the modified example accordingly has a smaller capacity than the center airbag 38 according to the above exemplary embodiment.

In the exemplary embodiment and modified example described above, examples have been explained in which the center airbag 38 is configured including three overhanging deployment sections 38D, 38P, 38F; however, the present invention is not limited thereto. It is sufficient that the center airbag 38 is configured including one out of the overhanging deployment sections 38D, 38P. Thus, for example, out of the three overhanging deployment sections, a configuration may be applied only including the overhanging deployment section 38D, a configuration may be applied only including the overhanging deployment section 38P, or configuration may be applied including one out of the overhanging deployment sections 38D, 38P, and the overhanging deployment section 38F.

In the exemplary embodiment and modified examples described above, examples have been explained in which the overhanging deployment sections 38D, 38P of the center airbag 38 respectively face the driver seat airbag 28 and the front passenger seat airbag 32 across the gaps C1, C2 therebetween; however, the present invention is not limited thereto. For example, in configurations in which the center airbag 38 includes the overhanging deployment section 38P, a configuration may be applied in which the gap C2 is not formed between the overhanging deployment section 38P and the front passenger seat airbag 32.

In the exemplary embodiment and modified examples described above, examples have been explained in which the center airbag 38 is inflated and deployed together with the front passenger seat airbag 32 from the instrument panel 18; however, the present invention is not limited thereto. For example, the center airbag 38 may be configured so as to be inflated and deployed from the instrument panel 18 independently to the front passenger seat airbag 32, or the center airbag 38 may be configured so as to be inflated and deployed from the roof RF.

In the exemplary embodiment and modified examples described above, examples have been explained in which the center airbag 38 is inflated and deployed on being supplied with gas from the inflator 34, which is common to the front passenger seat airbag 32; however, the present invention is not limited thereto. For example, a configuration may be applied in which the front passenger seat airbag 32 and the center airbag 38 are inflated and deployed on being supplied with gas from mutually different inflators.

In the exemplary embodiment and modified examples described above, examples have been explained in which the driver seat 12D and the front passenger seat 12P are disposed offset in the vehicle width direction with respect to the vehicle width direction center of the vehicle body; however, the present invention is not limited thereto. For example, a configuration may be applied in which, in a configuration in which a driver seat is disposed at the vehicle width direction center, a second airbag including an overhanging deployment section is inflated and deployed at one or both vehicle width direction sides of a driver seat airbag that is inflated and deployed in front of the driver D.

Obviously various other modifications may be implemented within a range not departing from the spirit of the present invention.

What is claimed is:

1. A vehicle airbag system comprising:
   a first airbag that is located at a vehicle front side of a vehicle front seat of a vehicle and that is supplied with gas and inflated and deployed toward a vehicle front surface of the vehicle front seat; and
   a second airbag that is supplied with gas and inflated and deployed so as to extend along a vehicle front-rear direction of the vehicle at a center of the vehicle in a vehicle width direction of the vehicle so as to be adjacent, in the vehicle width direction, to the first airbag at least at a vehicle rear side of the first airbag, the second airbag, when deployed, having a vehicle front end located at the center of the vehicle and a vehicle rear end located at the center of the vehicle, the second airbag including an overhanging deployment section that is positioned at the vehicle rear side of the first airbag and that is inflated and deployed jutting out beside the first airbag so as to cover a vehicle width direction end portion of the first airbag from the vehicle rear side of the first airbag.

2. The vehicle airbag system of claim 1, wherein:
the first airbag is a driver seat airbag that is inflated and deployed in front of a driver seat of the vehicle; and
the second airbag comprises a main deployment section that is inflated and deployed between the driver seat and a front passenger seat of the vehicle, and the overhanging deployment section, which is inflated and deployed jutting out toward the vehicle width direction outside from a vehicle rear end of the main deployment section so as to cover an end portion at the vehicle width direction center side of the driver seat airbag from the vehicle rear side of the driver seat airbag.

3. The vehicle airbag system of claim 2, wherein:
the second airbag further comprises a front side overhanging deployment section that is inflated and deployed jutting out from the main deployment section toward the vehicle width direction outside so as to cover an end portion at the vehicle width direction center side of the driver seat airbag from the vehicle front side of the driver seat airbag.

4. The vehicle airbag system of claim 1, wherein:
the first airbag is a front passenger seat airbag that is inflated and deployed in front of a front passenger seat of the vehicle; and
the second airbag comprises a main deployment section that is inflated and deployed between a driver seat of the vehicle and the front passenger seat, and the overhanging deployment section, which is inflated and deployed jutting out toward the vehicle width direction outside from a vehicle rear end of the main deployment section so as to cover an end portion at the vehicle width direction center side of the front passenger seat airbag from the vehicle rear side of the front passenger seat airbag.

5. The vehicle airbag system of claim 1, wherein:
in an inflated and deployed state, the overhanging deployment section faces across a gap toward a vehicle rearward facing portion of the first airbag.

6. The vehicle airbag system of claim 1, wherein:
the second airbag comprises a main deployment section and the overhanging section, the overhanging section projecting out toward a vehicle rear direction from an upper rear end of the main deployment section.

7. A vehicle airbag system comprising:
a first airbag that is located at a vehicle front side of a vehicle front seat of a vehicle and that is supplied with gas and inflated and deployed toward a vehicle front surface of the vehicle front seat; and
a second airbag that is supplied with gas and inflated and deployed at a center of the vehicle in a vehicle width direction of the vehicle so as to be adjacent, in the vehicle width direction, to the first airbag, and that includes an overhanging deployment section that is positioned at a vehicle rear side of the first airbag and that is inflated and deployed jutting out beside the first airbag so as to cover a vehicle width direction end portion of the first airbag from the vehicle rear side of the first airbag, wherein:
the first airbag is a driver seat airbag that is inflated and deployed in front of a driver seat of the vehicle;
the vehicle airbag system further includes a third airbag that is a front passenger seat airbag located at the vehicle front side of a front passenger seat of the vehicle and that is inflated and deployed in front of the front passenger seat; and
the second airbag comprises a main deployment section that is inflated and deployed between the driver seat and the front passenger seat, and a pair of overhanging deployment sections, which are respectively inflated and deployed jutting out from a vehicle rear end of the main deployment section toward both vehicle width direction sides so as to cover respective end portions at the vehicle width direction center sides of the driver seat airbag and the front passenger seat airbag from the vehicle rear sides of the driver seat airbag and the front passenger seat airbag.

8. The vehicle airbag system of claim 7, wherein:
outside faces, in the vehicle width direction, of the overhanging deployment sections are substantially planar faces running along an up-down direction and a front-rear direction.

9. The vehicle airbag system of claim 8, wherein:
each of the outside faces, in the vehicle width direction, of the overhanging deployment sections is a protruding face that protrudes outward in the vehicle width direction in plan view.

10. A vehicle airbag system comprising:
a first airbag that is located at a vehicle front side of a vehicle front seat of a vehicle and that is supplied with gas and inflated and deployed toward a vehicle front surface of the vehicle front seat; and
a second airbag that is supplied with gas and inflated and deployed at a center of the vehicle in a vehicle width direction of the vehicle so as to be adjacent, in the vehicle width direction, to the first airbag, and that includes an overhanging deployment section that is positioned at a vehicle rear side of the first airbag and that is inflated and deployed jutting out beside the first airbag so as to cover a vehicle width direction end portion of the first airbag from the vehicle rear side of the first airbag, wherein:
the first airbag is one of (i) a driver seat airbag that is located at the vehicle front side of a driver seat of the vehicle and that is inflated and deployed in front of the driver seat and (ii) a front passenger seat airbag located at the vehicle front side of a front passenger seat of the vehicle and that is inflated and deployed in front of the front passenger seat;
the vehicle airbag system further includes a third airbag that is the other one of (i) the driver seat airbag and (ii) the front passenger seat airbag; and
the second airbag is a center airbag that is inflated and deployed between the driver seat airbag and the front passenger seat airbag.

\* \* \* \* \*